United States Patent

Strawsine

[15] 3,636,661
[45] Jan. 25, 1972

[54] PLASTIC MIRROR TRACK

[72] Inventor: Frederick W. Strawsine, Corunna, Mich.

[73] Assignee: Strawsine Manufacturing Company, Corunna, Mich.

[22] Filed: July 22, 1970

[21] Appl. No.: 57,284

[52] U.S. Cl. ..................................49/413, 49/453, 49/463, 312/138, 312/209, 312/304
[51] Int. Cl. ..........................................E06b 3/46
[58] Field of Search..................49/413, 414, 453, 454, 434, 49/435, 463, 466, 458, 459; 312/138, 140, 209, 227

[56] References Cited

UNITED STATES PATENTS

| | | | |
|---|---|---|---|
| 2,877,511 | 3/1959 | Viola, Jr. | .................................49/413 |
| 3,065,507 | 11/1962 | Cloutier et al. | .....................49/435 X |
| 3,383,801 | 5/1968 | Dallaire | .............................49/413 X |
| 3,388,500 | 6/1968 | MacDonald | .........................49/413 X |
| 3,396,491 | 8/1968 | Giesbrecht | .............................49/413 |

Primary Examiner—David J. Williamowsky
Assistant Examiner—Philip C. Kannan
Attorney—Woodhams, Blanchard and Flynn

[57] ABSTRACT

An improved guide track for slidably guiding and retaining the upper edge of a slidable panel, such as the mirror of a medicine cabinet. The guide track comprises a downwardly directed channel-shaped member having substantially parallel legs defining a groove therebetween into which slidably extends the upper edge of the panel. One of the legs is provided with a resilient fin extending outwardly into the groove and positioned substantially directly over the upper edge of the panel. The fin acts as a restraining device for preventing vertical bouncing of the panel when same is used in a vehicle, such as a mobile home. The fin resiliently deflects to permit the upper edge of the panel to be moved therepast when the panel is lifted upwardly relative to the bottom track whereby the panel can be installed or removed from the upper and lower tracks.

10 Claims, 3 Drawing Figures

PATENTED JAN 25 1972  3,636,661

INVENTOR
FREDERICK W. STRAWSINE
BY
Woodhams, Blanchard & Flynn
ATTORNEYS

PLASTIC MIRROR TRACK

FIELD OF THE INVENTION

This invention relates to an improved guide track structure for cooperating with and slidably guiding the upper edge of a slidable panel, and particularly relates to an improved guide track structure having a resilient restraining device for preventing inadvertent vertical displacement or bouncing of a slidable closure panel, such as a slidable medicine cabinet mirror as mounted in mobile homes and the like.

BACKGROUND OF THE INVENTION

Most slidable panels or closure members, such as the slidable mirrors on medicine cabinets, are slidably guided within upper and lower tracks having upper and lower guide slots which slidably receive therein the upper and lower edges of the mirror. To facilitate the mirror installation, the guide slot provided in the upper track is normally of a substantially greater depth than the slot provided in the lower track to permit the upper edge of the mirror to be initially inserted into the upper guide slot, the mirror being pushed upwardly to substantially the full depth of the upper guide slot. The lower edge of the mirror is then moved laterally so as to be directly above the lower track, whereupon the lower edge of the mirror is then moved downwardly into the lower guide slot.

The above closure structure and assembly technique have been known for many years and operate in a satisfactory manner when mounted on a relatively static structure, such as a building or house.

Due to the economics of manufacturing and assembling a slidable closure panel and associated guide track structure having the above characteristics, wide scale attempts have been made to utilize same on mobile homes, mobile recreation vehicles and the like. Particularly, numerous medicine cabinets have been installed on mobile homes and vehicles over a substantial number of years, which medicine cabinets are generally constructed in the manner as described above whereby the mirror has free vertical movement within the upper guide slot to permit same to be easily inserted into or removed from the guide track. However, this type of guide track structure has resulted in a serious problem when mounted in vehicles.

Specifically, the problem has long confronted the trailer and mobile home industry of how to successfully and securely retain the slidable mirror within the guide tracks when the vehicle is being transported from one location to another. When the trailers or vehicles are being transported, they often travel over rough surfaces which cause the trailer or vehicle to be vertically bounced or jostled, which in turn causes a vertical bouncing or jostling of the mirror within the guide tracks. The depth of the upper guide slot, which provides substantial clearance above the upper edge of the mirror, enables the mirror to freely bounce or jostle, which can cause the mirror to be broken, chipped, or damaged. In fact, the vertical bounding of the mirror sometimes permits the lower edge of the mirror to escape completely from the lower track, whereupon the mirror thus falls out of the tracks.

In an attempt to overcome the vertical bouncing or jostling of the mirrors as mounted on medicine cabinets of mobile vehicles, various locking devices and/or adjustable guide track structures have been utilized. However, all of these devices and/or track structures have been undesirable since they have substantially increased the cost and complexity of manufacturing and/or assembling the cabinet. Further, many of these prior structures have also interfered with the free slidability of the mirror.

Accordingly, it is an object of the present invention to provide an improved track structure for use with a slidable closure member and particularly for use on mobile homes and vehicles.

A further object of the present invention is to provide a guide track adapted to coact with the upper edge of a slidable panel, such as the slidable mirror of a medicine cabinet, with the guide track having resilient retaining means disposed directly adjacent the upper edge of the mirror for preventing bouncing or jostling of the mirror.

Still a further object of the present invention is to provide a guide track, preferably constructed of plastic, and having a channel-shaped configuration defining a downwardly directed slot adapted to slidably receive the upper edge of a slidable panel, such as a mirror, with one of the channel legs having a resilient flange or fin secured thereto and extending outwardly into the slot for deposition directly over the upper edge of the mirror.

It is also an object of the present invention to provide an improved track structure, as aforesaid, wherein the resilient flange is disposed substantially midway between the top and bottom of the slot for permitting the upper edge of the mirror to be forcibly moved past the flange to enable the lower edge of the mirror to be installed into the lower guide track.

Other objects and purposes of the present invention will be apparent to persons acquainted with devices of this tape upon reading the following specification and inspecting the accompanying drawings.

Figure 1:
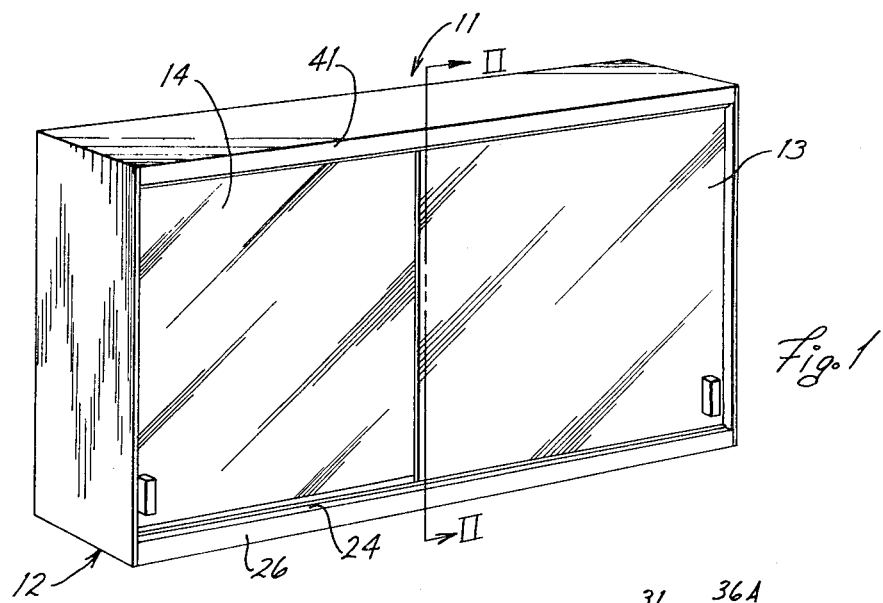
FIG. 1 is a perspective view of a medicine cabinet having a pair of slidable mirror panels mounted thereon, same being conventional excepting for the use therein of mirror tracks of the invention.

Certain terminology will be used in the following description for convenience in reference only and will not be limiting. The words "rightward" and "leftward" will refer to directions in the drawings to which reference is made. The words "upper" and "lower" will refer to the relative positions of the guide tracks and of the slidable panels as same are conventionally mounted, and as illustrated in the drawings. The words "inward" and "outward" will refer to directions toward and away from the geometric center of the device and designated parts thereof. Said terminology will include the words above specifically mentioned, derivatives thereof and words of similar import.

SUMMARY OF THE INVENTION

The objects and purposes of the present invention are met by providing a closure structure having upper and lower opposed guide tracks and a slidable panel extending between and slidably received within the upper and lower guide tracks. The present invention is particularly applicable to a medicine cabinet having upper and lower channel-shaped guide tracks disposed in opposed relationship to one another and having the upper and lower edges of a slidable mirror panel positioned within the slots of the upper and lower guide tracks, respectively. The upper guide track is provided with a resilient flange or fin fixedly secured to one of the legs of the upper channel-shaped track, which resilient fin is disposed substantially vertically midway of the upper slot and extends transversely into the slot so as to be normally disposed directly over the upper edge of the mirror panel to prevent vertical bouncing or jostling thereof, such as encountered when the medicine cabinet is mounted on a mobile vehicle or trailer. The resilient flange permits the mirror panel to be installed by inserting the upper edge of the mirror into the upper slot with the upper edge being forced upwardly beyond the flange so as to cause resilient deflection thereof. The lower edge of the mirror is then moved laterally over the lower slot and the mirror is then moved vertically downwardly into the lower slot, whereupon the upper edge of the mirror is again moved downwardly below the flange. The flange then resiliently returns to its normal transverse position wherein same is disposed directly above the upper edge of the mirror panel.

DETAILED DESCRIPTION

FIG. 1 illustrates therein a cabinet 11, such as a conventional medicine cabinet, having a housing 12 and a pair of slidable closure panels or mirrors 13 and 14. The slidable panels 13 and 14 have their upper and lower edges respectively slidably confined within upper and lower track members 16 and 17.

The lower track member 17 (FIG. 2) includes a substantially downwardly directed channel-shaped portion 18 having a plurality of upwardly extending, substantially parallel legs 19, which legs define therebetween front and rear track grooves 21 and 22, respectively. The lower track member 17 also has an outwardly and upwardly inclined flange 23 secured to the front edge thereof, which flange 23 is confined within the channellike lip 24 of the lower front housing member 26 for securing and positioning the lower track member 17 along the lower front edge of the housing 12.

The upper track member 16 is formed as a downwardly directed, channel-shaped member 29 having a base wall 31 and a plurality of downwardly extending, substantially parallel legs 32, 33 and 34. The legs 32, 33, and 34 are spaced to define front and rear track grooves or slots 36 and 37 therebetween, which slots extend longitudinally of the track member 16 and open in the downward direction.

The track 16 also has an outwardly and downwardly inclined flange 38 on the front side thereof, which flange 38 is similar to the flange 23 provided on the lower track 17 and extends outwardly so as to be confined within the channellike lip 39 of the upper front housing member 41 for retaining the upper track 16 along the upper front edge of the cabinet 11.

The upper track 16 is provided with resilient restraining structure for preventing vertical bouncing of the mirror panels, which restraining structure specifically includes a resilient flange or fin 42 fixedly secured to the front leg 32. The fin 42 extends outwardly into the front track slot 36 and extends across a major portion of the width of the slot so as to divide the slot 36 into upper and lower slot portions 36A and 36B, respectively. The fin 42 extends substantially transversely relative to the leg 32 and also in this embodiment extends continuously along the complete longitudinal length of the leg.

A similar resilient flange or fin 43 is fixedly secured to and extends transversely outwardly from the leg 33. The fin 43 also divides the rear track slot 37 into upper and lower portions 37A and 37B, respectively.

Figure 2:
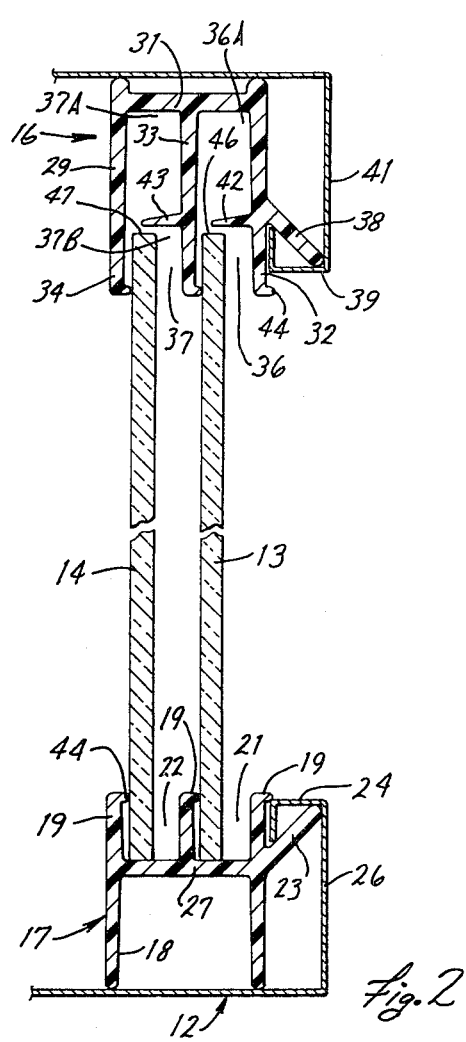
FIG. 2 is an enlarged, elevational, sectional view taken along the line II—II of FIG. 1, and illustrating therein the improved track structure according to the present invention.

As illustrated in FIG. 2, the fins 42 and 43 are each disposed inwardly a substantial distance from the free end of the legs 32 and 33, while at the same time they are disposed downwardly a substantial distance from the base wall 31, the fins 42 and 43 thus being disposed substantially vertically midway between the upper and lower ends of the legs 32 and 33.

In a preferred embodiment of the invention, the track 16 is preferably constructed of plastic whereby the fins 42 and 43 are thus integrally connected to their respective legs 32 and 33, thereby enabling the complete upper track member 16 to be integrally formed as a one-piece member, such as by extruding same from plastic.

The lower track 17 is also preferably constructed of plastic, such as by being integrally extruded as a one-piece member in substantially the same manner as described above for the upper track.

The upper and lower tracks 16 and 17 are each preferably provided with laterally projecting ribs 44 adjacent the free ends of the legs, which ribs function as guiding projections for slidably bearing against the lateral sides of the mirror panels 13 and 14 so as to permit the mirror panels to be slidably guided within the tracks while at the same time minimizing friction and lateral play or looseness.

ASSEMBLY AND OPERATION

FIG. 2 illustrates therein the improved closure structure according to the present invention wherein the vertical panels 13 and 14, such as the slidable mirrors of a medicine cabinet, are installed within and slidable relative to the upper and lower tracks 16 and 17. When in the installed position, the lower edges of the slidable panels 13 and 14 are disposed within the front and rear track slots 21 and 22 as provided in the lower track 17, the weight of the panels 13 and 14 being transferred directly to the base portion 27 of the lower track 17. The upper edges of the panels 13 and 14 are similarly disposed within the front and rear track slots 36 and 37, respectively, as provided in the upper track 16 for laterally confining the panels while at the same time enabling each panel to be horizontally slidably within the plane thereof. The upper edges of the panels 13 and 14 are disposed within the lower slot portions 36B and 37B, with the upper ends 46 and 47 of the panels 13 and 14, respectively, being disposed closely adjacent but directly under the resilient fins 42 and 43 substantially as illustrated in FIG. 2. The fins 42 and 43 thus vertically confine the panels 13 and 14 and prevent same from being vertically jostled or bounced, thereby preventing the panels 13 and 14 from becoming accidentally dislodged from the lower track 17.

The fins 42 and 43, while being preferably constructed of plastic and being integrally connected to the legs 32 and 33, possess sufficient stiffness to substantially vertically restrain the panels 13 and 14, the panels thus being effectively vertically restrained between the fins 42 or 43 and the base portion 27 of the lower track 17. The fins possess sufficient strength to vertically restrain the panels, even when the panels are subjected to vertical bouncing or jostling such as occurs when a mobile home or vehicle travels over rough roads, rough railroad tracks, or the like.

Figure 3:
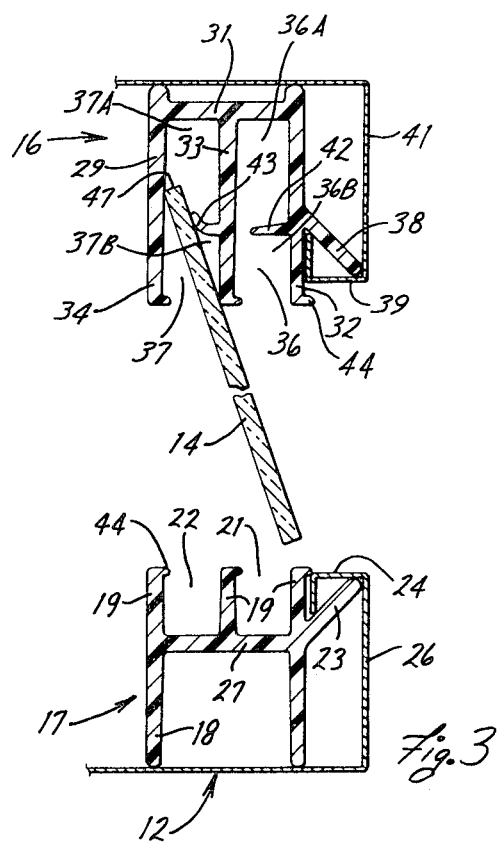
FIG. 3 is a sectional view similar to FIG. 2 and illustrating the manner in which the mirror panels are installed into the upper and lower guide tracks.

To permit the panels 13 and 14 to be easily installed within the tracks 16 and 17, the selected panel, such as the rear panel 14 illustrated in FIG. 3, is first angularly positioned such that the upper edge thereof extends into the selected upper slot, such as the rear slot 37, the lower edge of the panel being displaced laterally outwardly from the lower track 17. The upper edge of the panel 14 is then forced upwardly to the slot 37 so as to cause a resilient deflection of the fin 43 (FIG. 3), the upper edge 47 of the panel 14 thus extending into the normally unoccupied upper slot portion 37A. When the upper edge of the panel is disposed within the upper slot portion 37A, the lower edge of the panel 14 is at an elevation above the uppermost elevation of the lower track 17, whereupon the lower edge of the panel 14 can then be laterally moved (leftwardly in FIG. 3) so as to be positioned directly over the lower track, such as over the rear track slot 22. The panel 14 is then lowered so that the lower edge thereof extends into the track slot 22. This lowering of the panel 14 causes the upper edge 47 thereof to be retracted from the upper slot portion 37A into the lower slot portion 37B, whereupon the fin 43 then resiliently returns to its normal position (as illustrated in FIG. 2) wherein it is disposed closely adjacent and above the upper end 47 of the panel 14.

When the rear panel 14 is installed, the front panel 13 is then installed in a manner identical to that above described. Removal of the panels from the tracks is a reversal of the installation operation explained above, and thus further description thereof is not believed necessary.

While the illustrated and described embodiment of the invention discloses a double track, that is, a track provided with a pair of slots and designed for accommodating a pair of laterally displaced slidably panels, it will be readily apparent that the present invention is equally applicable to tracks having only a single groove and to three or more grooves therein.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which I claim an exclusive property or privilege are defined as follows:

1. A closure structure, comprising:
   an elongated lower track means having an upwardly opening lower guide slot extending longitudinally thereof;
   an upper track means disposed substantially vertically above said lower track means and having a downwardly opening upper guide slot extending longitudinally thereof, said upper guide slot being disposed opposite and spaced from said lower guide slot;
   a substantially vertically oriented panel extending between and slidably received within said upper and lower track means, the lower edge of said panel being slidably received within said lower slot and the upper edge of the panel being slidably received within said upper slot, whereby said panel is slidably movable relative to said track means in the longitudinal direction thereof; and
   movable retainer means mounted on said upper track means and disposed within said upper slot for normally preventing undesired upward vertical movement of said panel, said movable retainer means being spaced downwardly from the upper end of said upper slot and being disposed closely adjacent and directly above the upper edge of said panel for preventing undesired vertical movement thereof, said retainer means being movable for permitting the upper edge of said panel to be moved into a position adjacent the upper end of said upper slot during installation of the panel.

2. A structure according to claim 1, wherein said movable retainer means is normally resiliently maintained in a position closely adjacent and directly above the upper edge of said panel.

3. A structure according to claim 2, wherein said movable retainer means extends substantially throughout the complete length of the upper track means for substantially preventing undesired upward vertical movement of the panel irrespective of the longitudinal position of the panel relative to said track means.

4. A structure according to claim 1, wherein said movable retainer means comprises a resilient, cantilevered, substantially horizontally extending fin having one end thereof secured to said upper track means. above the 5. A structure according to claim 1, wherein said upper track means comprises a substantially downwardly directed channel-shaped member having a substantially horizontal top wall portion and a pair of substantially parallel downwardly extending vertical wall portions, said vertical wall portions defining said upper guide slot therebetween, and said movable retainer means comprising a cantilevered projection fixedly secured to one of said vertical wall portions with said projection extending outwardly into said slot in a direction toward the other vertical wall portion, said cantilevered projection being spaced vertically upwardly a substantial distance from the lower free ends of said vertical wall portions and also being spaced vertically downwardly a substantial distance from said top wall, said projection being normally disposed closely adjacent and directly above the upper edge of said panel.

6. A structure according to claim 5, wherein said channel-shaped member and said projection are integrally constructed as a one-piece plastic member.

7. A structure according to claim 5, wherein said projection comprises a narrow resilient fin extending outwardly from said one vertical wall portion in a direction substantially transverse thereto with said fin extending outwardly across at least approximately one-half the width of said upper slot.

8. A structure according to claim 5, wherein said channel-shaped member includes a third vertical wall portion cooperating with one of said first-mentioned vertical wall portions for defining a second downwardly opening upper guide slot therebetween, said second upper slot being disposed adjacent and substantially parallel with said first-mentioned upper slot;
   said lower track means also including a second upwardly opening lower guide slot formed therein adjacent and substantially parallel with said first-mentioned lower slot; and
   a second panel extending between said upper and lower track means and having the upper and lower edges thereof slideably extending into and received within the second upper slot and the second lower slot, respectively;
   said upper track means further including a second cantilevered projection secured to one of the vertically extending wall portions defining said second upper slot with said second projection extending outwardly into said second upper slot so as to be disposed closely adjacent and directly above the upper edge of said second panel for preventing undesired upward vertical movement thereof, said second projection being vertically spaced downwardly from the upper end of said second upper slot.

9. An improved track structure for slidably guiding the edge of a panel for permitting sliding movement of the panel longitudinally of the track while preventing undesired transverse movement of the panel, said track structure comprising an elongated channel-shaped member having a base wall and at least three substantially parallel sidewalls fixedly connected to and extending substantially transversely outwardly from one surface of said base wall, said first and second sidewalls being spaced from one another to define a first elongated slot therebetween, said second and third sidewalls being spaced from one another to define a second elongated slot therebetween, said first and second elongated slots being parallel and spaced one from another by means of the intermediate second sidewall, the internal surfaces of the first and second sidewalls as defining said first slot being substantially smooth except for the provision of a first resilient flange fixedly secured to one of said first and second sidewalls with said first flange extending into said first slot in a direction toward the other of said first and second sidewalls, said first flange projecting across at least approximately one-half the width of said first slot, and the internal surfaces of said second and third sidewalls as defining said second slot being substantially smooth except for the provision of a projecting second resilient flange secured to one of said second and third sidewalls with said second flange projecting outwardly into said second slot in a direction toward the other of said second and third sidewalls, said second flange extending across at least approximately one-half the width of said second slot, and said first and second resilient flanges being spaced between said base wall and the free ends of said sidewalls.

10. A track structure according to claim 9, wherein said channel-shaped member and said first and second flanges are integrally constructed of plastic.

* * * * *